United States Patent [19]
Bishop

[11] Patent Number: 5,370,196
[45] Date of Patent: Dec. 6, 1994

[54] TAG AXLE SYSTEM

[75] Inventor: Ronald L. Bishop, Hagerstown, Md.

[73] Assignee: Jerr-Dan Corporation, Greencastle, Pa.

[21] Appl. No.: 152,595

[22] Filed: Nov. 15, 1993

[51] Int. Cl.$^5$ ............................................. B62D 61/12
[52] U.S. Cl. ................................ 180/24.02; 280/405.1
[58] Field of Search ................ 180/24.02, 22, 209; 280/405.1, 414.5

[56] References Cited

U.S. PATENT DOCUMENTS

| | | | |
|---|---|---|---|
| 2,777,529 | 1/1957 | Harberg . | |
| 2,952,326 | 9/1960 | Page | 180/24.02 |
| 3,450,221 | 6/1969 | Nielson | 180/24.02 |
| 3,743,315 | 7/1973 | Bilas | 180/24.02 |
| 4,146,243 | 3/1979 | Sims | 180/24.02 |
| 4,165,884 | 8/1979 | Allison et al. | 180/24.02 |
| 4,614,247 | 9/1986 | Sullivan | 180/24.02 |
| 5,018,593 | 5/1991 | Hermann | 180/24.02 |
| 5,303,946 | 4/1994 | Youmans et al. | 280/405.1 |

FOREIGN PATENT DOCUMENTS 209919 12/1966 Sweden ............................ 180/24.02

Primary Examiner—Eric D. Culbreth
Assistant Examiner—Kevin Hurley

[57] ABSTRACT

A tag axle assembly allows auxiliary axle support to a vehicle (12). The assembly includes a support frame (24) having a pair of vertical supports (26) connected to the load bed subframe (14), a cross beam (58) connects the supports (26). An axle engaging assembly (66) including an auxiliary axle (70) is pivotable with respect to the frame (24) and cross beam (58) for pivoting the auxiliary wheels (22) between engaged and unengaged positions. Pivot plates (80) are connected to the axle (70) and are pivoted by an actuator (94) between a generally horizontal position in the engaged position and a near vertical position in the unengaged position. The auxiliary axle (70) includes torque arms (72) connected thereto for receiving the wheels (22) for pivoting with the axle (70). The vertical supports (26) are comprised of a pair of triangular plates (32, 33) enclosing the actuator (94).

18 Claims, 3 Drawing Sheets

TAG AXLE SYSTEM

TECHNICAL FIELD

The invention relates to a tag axle system for selectively providing an auxiliary, ground engaging axle to allow additional support in load bearing vehicles and to allow retraction to a stored, unengaged position.

BACKGROUND ART

Tag axle systems are known in which an auxiliary axle with wheels attached thereto is moved to its stored, unengaged position and lowered in an engaged load bearing position to provide auxiliary axle and wheels for a load bearing vehicle. The tag axle must be stable and positionable for ground engagement, and movable to a second stored or transport position. In the transport position, the extra or auxiliary wheels should not interfere with the other functions of the vehicle.

One such tag axle system is illustrated in U.S. Pat. No. 4,146,243, issued Mar. 27, 1979 in the name of Sims. This patent discloses a linkage tag axle system wherein a power actuator rotates the linkage and a beam to bring the wheels into ground engaging position and a second power actuator pivots the beams upwardly to raise the wheels and tire set.

A simplified suspension system is illustrated in U.S. Pat. No. 3,743,315, issued Jul. 3, 1973 in the name of Bilas. This system discloses an auxiliary wheel and axle assembly for a trailer vehicle. A semi-elliptic spring positioned transversely of the vehicle is secured thereto and to the wheels and axle assembly. The spring lifts the assembly from a road surface. Air bags positioned between the wheel and axle assembly and the vehicle permit the wheel and axle assembly to be lifted from the road surface by the semi-elliptic spring or engaged on the road surface in a weight carrying relation to the trailer vehicle when the air bags are inflated.

SUMMARY OF THE INVENTION

The invention includes a tag axle assembly adapted to selectively provide additional support for a load bearing vehicle. The assembly comprises a support frame adapted to be fixedly connected to a vehicle for supporting a pair of auxiliary wheels. Engaging means is operatively connected to the support frame and the auxiliary wheels for moving between a retracted position removing the auxiliary wheels from ground level and an extended position extending the auxiliary wheels to ground level. Control means is operatively connected to the engaging means for selectively controlling the retraction and extension of the engaging means. The control means includes actuator means operatively connected between the support frame and the engaging means for moving the engaging means. The assembly is characterized by the support frame including housing means for containing the actuator means and supporting the engaging means.

The invention also includes the support frame including a pair of vertical supports having upper and lower integral ends for connection to the vehicle at the upper end. The upper end has a width greater than the lower end. The engaging means includes longitudinal pivot means pivotally connected to the lower end of the support member and having a first end adapted to be connected to a wheel and a second end, and a pivot point between the first and second ends for connection to the support member for pivoting between the engaged position and the non-engaged position with the first end aligned with the support member.

The invention also includes the engaging means including a longitudinal pivot plate extending from the support member toward the rear wheels for pivoting between a first position with the pivot plate substantially horizontal and the wheels in contact with a road surface, and a second position with said pivot plate substantially vertical end the wheels raised out of contact with a road surface.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENT

Figure 1:
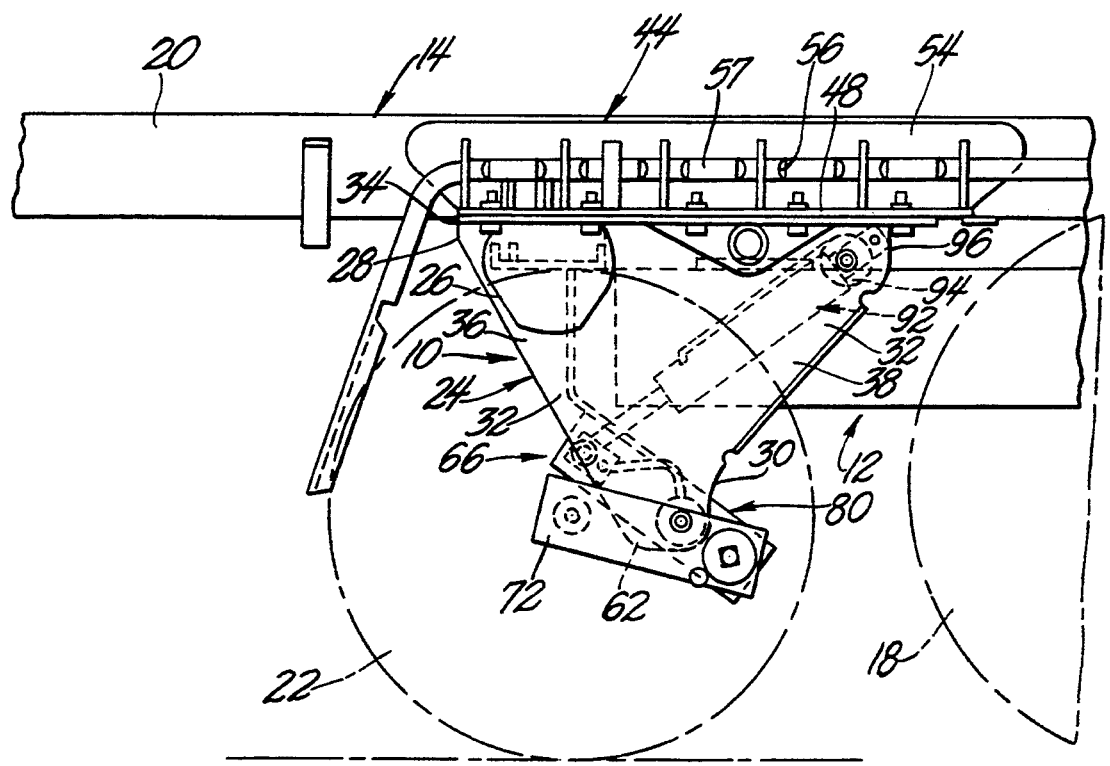
FIG. 1 is a partial side elevational view of a vehicle with the tag axle assembly in the extended engaged position.
Figure 2:
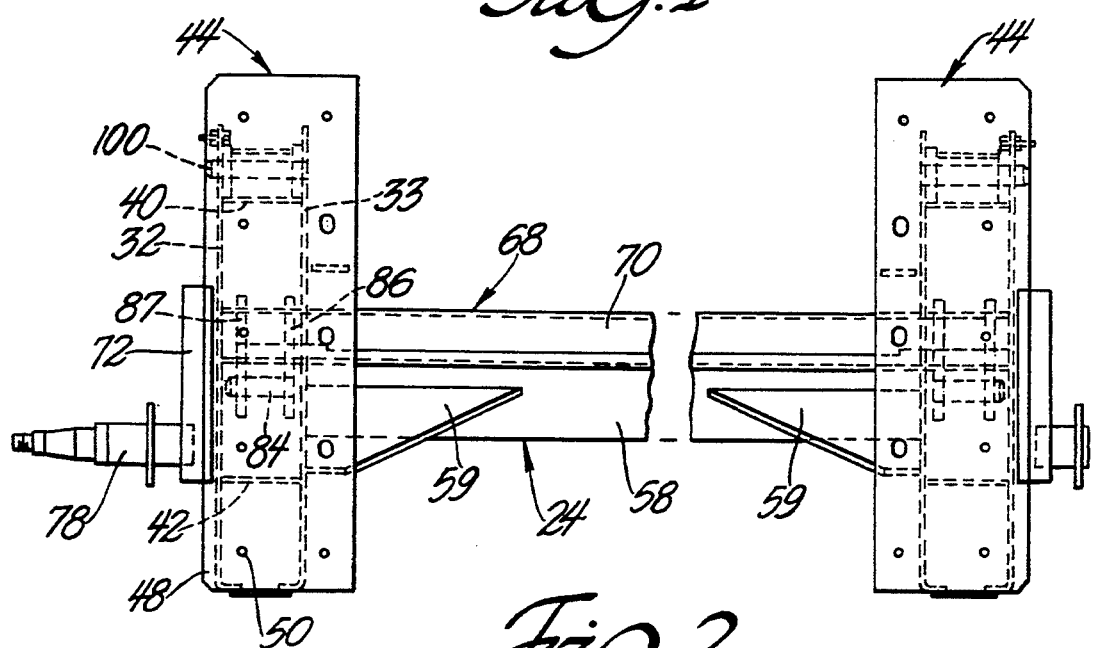
FIG. 2 is a top elevational view of FIG. 3 along lines 2—2 of FIG. 3.
Figure 3:
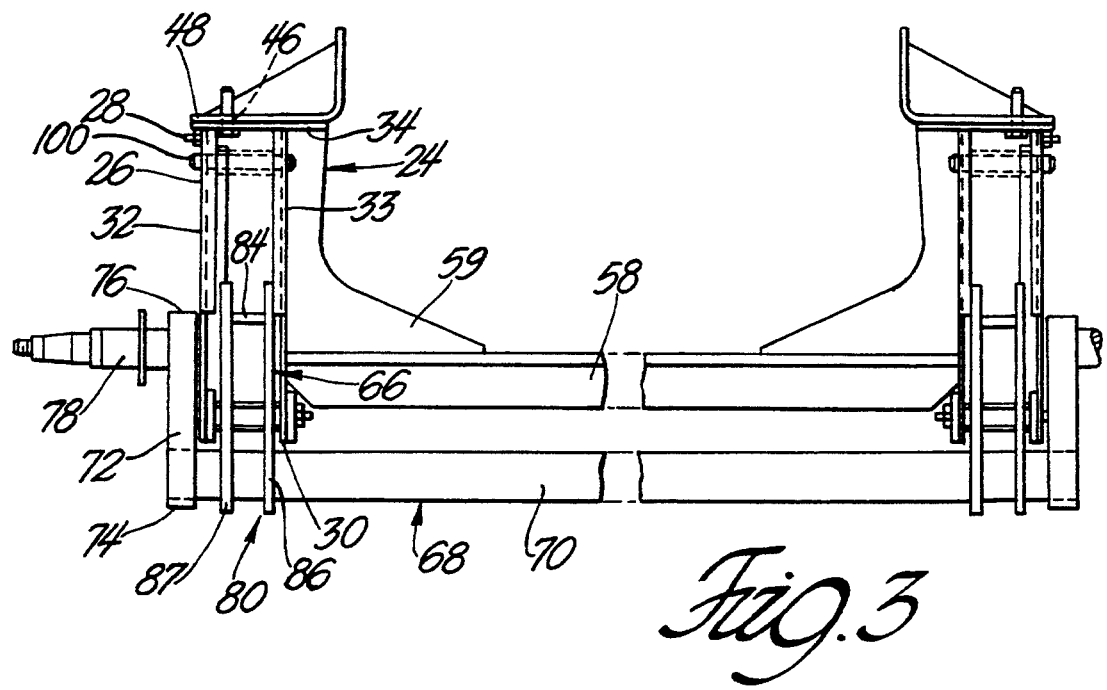
FIG. 3 is a rear elevational view of the tag axle assembly taken along lines 3—3 of FIG. 4.

A tag axle assembly is generally shown at 10 in FIGS. 1-4. The tag axle assembly 10 is adapted to selectively provide auxiliary support or suspension to a load bearing vehicle 12 having a vehicle frame and a tilting carrier or load bed with bed subframe 14. The load bearing vehicle 12 with bed subframe 14 is commonly known in the art and exemplified in U.S. Pat. No. 5,133,633, issued Jul. 28, 1992. The tag axle assembly 10 is located behind the rear vehicle wheel 18 of the vehicle 12, between the rear vehicle wheel 18 and the rear end 20 of the vehicle 12.

The assembly 10 includes a pair of auxiliary wheels 22 which are selectively engaged and disengaged in a ground support position for providing auxiliary load bearing support to the vehicle frame and the tilting load bed subframe 14. In the preferred embodiment, the assembly 10 is fixedly mounted to the bed subframe 14.

The tag axle assembly 10 includes an axle support frame 24 adapted to be fixedly connected to the tilting load bed subframe 14. The support frame 24 includes a pair of vertical supports 26 each having upper 28 and lower 30 ends. The vertical supports 26 are connected to the load bed at the upper end 28 thereof.

Each of the vertical supports 26 generally comprise a pair of spaced apart, triangular parallel plates 32, 33 connected to one another at their upper ends 28 or triangle base thereof by an upper panel 34. The sides 36, 38 of the triangular plates 32 are connected to one another at a portion thereof by support side panels 40, 42. The panels 34, 40, 42 are generally welded to the plates 32, 33.

Mounting brackets 44 are fixedly connected to the upper panels 34 for subsequent connection to the load bed 14. The mounting brackets 44 connect the vertical supports 26 perpendicular to the load bed 14. The upper panel 34 includes a series of apertures 46 therein for connection to the mounting bracket 44. Each mounting bracket 44 comprises an L-shaped plate extending the length of the base 28 of the triangle support 26 and upper panel 34. A first, horizontal side 48 of the bracket 44 includes apertures 50 therein for aligning with the apertures 46 of the upper panel 34 so as to receive fasteners 52 to connect the bracket 44 to the supports 26 through the apertures 46, 50. The second, vertical leg 54 of the bracket 44 includes several horizontal slots 56 therein provided for welding to the load bed subframe 14.

A structural cross beam 58 is fixedly connected or welded between the interior plates 33 of the vertical supports 26 in perpendicular relation thereto near the lower end or vertex 30 thereof. A reinforcing corner arm 59 is connected at the intersection between the interior plates 32 of the vertical supports 26 and the cross beam 58 extending to and welded to the upper panel 34, and includes a bend 60 therein. The cross beam 58 generally comprises an L-shaped configuration as best illustrated in FIG. 4.

Each of the plates 32, 33 of the vertical support 26 form support weldments 62 at the lower end 30 which extend from and below the cross beam 58 and are integral with the plates 32, 33. The support weldments 62 include apertures 64 therein.

Figure 4:
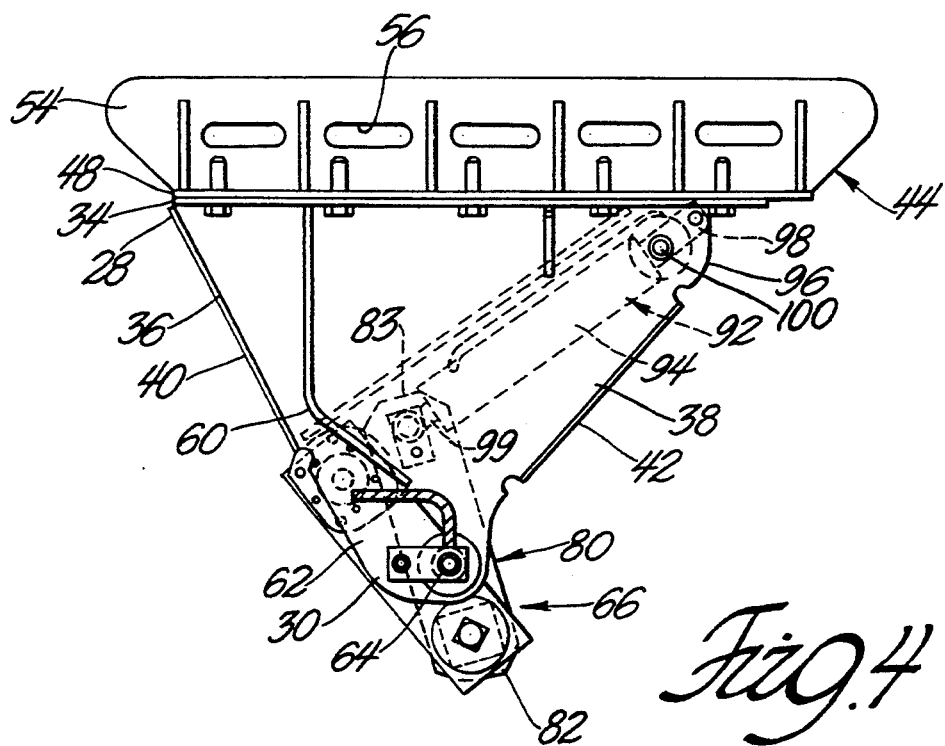
FIG. 4 is a side elevational view as in FIG. 1 with the tag axle assembly in the retracted position.

The assembly 10 includes engaging means 66 operatively connected to the support frame 24 and the auxiliary wheels 22 for moving between an extended, engaged position with the auxiliary wheels 22 contacting a road surface (FIG. 1), and a retracted, non-engaged position with the auxiliary wheels 22 a road surface supporting the load bed 14 (FIG. 4).

The engaging means 66 includes axle means 68 extending between the pair of wheels 22 and pivotally connected to the support frame 24 for pivoting between the engaged and non-engaged positions. The axle means 68 includes a longitudinal axle 70 extending between the supports 26. The axle 70 generally comprises a commonly available longitudinal axle of the type rubber torsion suspension axle.

The axle means 68 also includes torque arm means 72 connected to the ends of the axle 70. The torque arm means 72 includes first 74 and second 76 longitudinal ends. The torque arm means 72 is operatively secured to the axle 70 at the first end 74 and is secured to the auxiliary wheel 22 at the second end 76 for pivoting the axle 70 with the torque arms 72 substantially horizontal when the assembly 10 is in the engaged position. The torque arm means 72 includes a wheel pin or spindle 78 extending outwardly from the second end 76 for supporting the wheel 22 thereon. The torque arm means 72 comprises a longitudinal, substantially flat, rectangular plate.

The engaging means 66 also includes pivot plate means 80 having first 82 and second 83 ends. The pivot plate means 80 is connected between a pair of the plates 32, 33 of the vertical supports 26 and is connected to the axle 70 at its first end 82. The pivot plate means 80 is also connected to the vertical supports 26 at a central pivot point between the first and second ends 82, 83 for pivoting the axle 70. The second ends 83 of the pivot plate means 80 are connected to one another by a bushing 84 therebetween.

The pivot plate means 80 generally comprises a pair of spaced, longitudinal pivot plates 86, 87 connected to each of the vertical support plates 32, 33. The pivot plates 86, 87 are connected within and between the respective pairs of support weldments 62. The first inner pivot plate 86 is adjacent the support weldment 62 adjacent the inner plate 33. The outer pivot plate 87 is connected adjacent the support weldment 62 adjacent the outside plate 32. The plates 86, 87 include an aperture 88 at their pivot point for receiving a pivot pin 90 which extends between and through the pivot plates 86, 87 and through the apertures 64 of the support weldments 62 for connecting the pivot plates 86, 87 with the frame 24.

The assembly 10 also includes actuator means 92 operatively connected to the support frame 24 and the engaging means 66 for selectively moving the engaging means 66 between the non-engaged position and a maximum, engaged position. The actuator means 92 generally includes a hydraulic actuator 94. The actuator 94 extends between the plates 32, 33 of the vertical support 26 and from one corner 96 of the triangle base 28 to the bushing 84 of the pivot plates 82, 83. The hydraulic actuator 94 includes a first end 98 connected to the forward corner 96 of the base 28 of the support 26 via a pin 100. A second, retractable end 99 of the actuator 94 is connected to the bushing 84 of the pivot plate means 80. More particularly, the second end 99 of the actuator 94 is welded to the bushing 84.

Therefore, it can be seen that as the actuator 94 moves between its extended position or ground engaging position, the torque arms 72 are in a generally horizontal position. As the actuator 94 retracts, the second end 83 of the pair of pivot plates 86, 87 is raised thereby rotating the axle 70 and first end 82 of the pivot plates 86, 87 to a lower position thereby raising the second end 76 of the torque arm 72 to raise the wheels 22. When the actuators 94 are extended, the axle 70 rotates with the support weldments 62 allowing the wheels 22 to contact the road.

In operation, FIG. 4 illustrates the assembly 10 in its stored or unextended position. In this position, the actuator means 92 is retracted which pivots the pivot plates 86, 87 to an almost vertical position which in turn pivots and pulls up the pivot plates 86, 87 to raise the auxiliary wheels 22. It should be understood that each of the actuator means 94 is actuated concurrently and simultaneously in the same manner such that the axle means 68 remains horizontal at all times through the while pivoting movement. The torque arm 72 is offset approximately 22°–30°. However, the invention is not limited to these offsets. From the pivot plates 86, 87 when in the unengaged position, which is characteristic of common axle performance. For actuation to its extended or engaged position as illustrated in FIG. 1, the actuator means 92 is operated to its extended maximum position. This in turn pushes the end 83 of the pivot plate means 80 downwardly to a position with the pivot plates 86, 87 generally horizontal and aligned with the torque arm means 72. The pivot plates 86, 87 and actuator 94 are connected and move between each of the plates 32, 33 of the vertical support 26. The pivot plates 86, 87 move between a generally vertical position in the unengaged position and a generally horizontal position in the ground engaging position, as in the first embodiment. In this position, the assembly 10 is providing additional support to the vehicle 12 and its load bed subframe 14.

Figure 5:
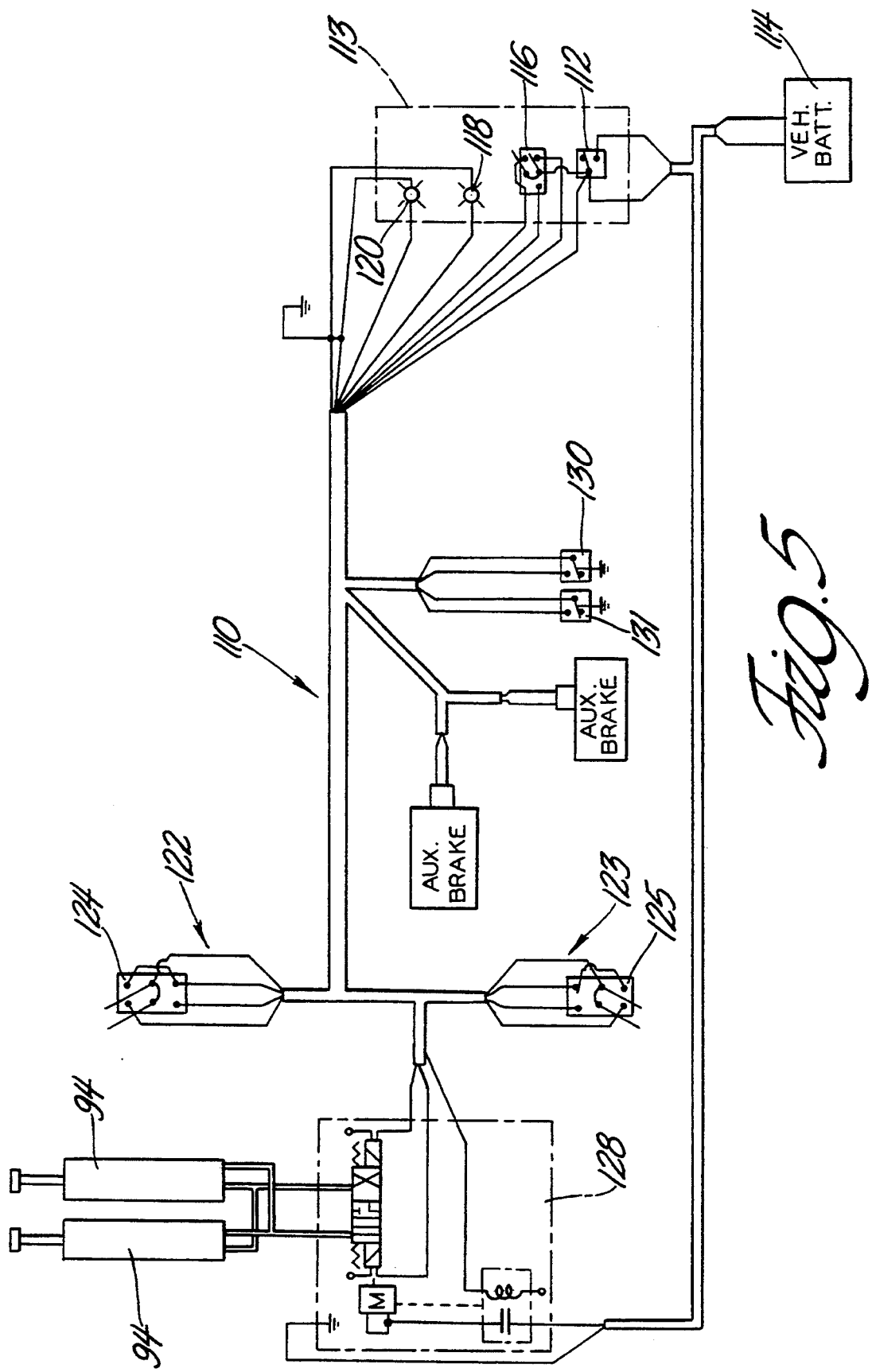
FIG. 5 is a schematic diagram of the control means of the subject invention.

The assembly 10 also includes control means 110 for controlling the actuator 94 between the extended and retracted position. The control means 110 is illustrated in FIG. 5.

The control means 110 includes a master power switch 112 having an on and off position for connecting and disconnecting the vehicle battery power 114 to the control means 110. The power switch 112 is generally connected in the cab 113 of the vehicle 12 to allow disabling of the entire system by the operator of the vehicle 12 when not in use and prevent tampering with the assembly 10.

Also included in the cab 113 of the vehicle 12 is a toggle actuating switch 116 having generally three positions of up, neutral, and down. Actuation of the toggle switch 116 to the up position actuates the actuator means 92 to retract the tag axle assembly 10, and actuation of the toggle switch 116 to the down position causes the actuator means 92 to extend the tag axle assembly 10. Also included is a down indicator light 118 generally for illuminating when the tag axle assembly 10 is in the down, extended position. Further, there is an up indicator light 120 for indicating when the tag axle assembly 10 is in its fully retracted position.

Also included is a passenger side and driver side control box 122, 123 located near the tag axle assembly 10 at the load bed external the vehicle 12. The control boxes 122, 123 also includes toggle switches 124, 125 for controlling up and down positions of the tag axle assembly 10, the same as the cab toggle switch 116. All of the toggle switches 116, 124, 125 are double pole, double throw center off (neutral) switches. A DC hydraulic power unit 128 is connected to the switches 112, 116, 124, 125 to control the hydraulic power to the actuators 94.

A pair of pressure switches 130, 131 are connected to the actuator 94 to sense the pressure of hydraulic fluid and actuate the appropriate light 118, 120 when a predetermined pressure is reached. Switch 130 is connected in the rod side of the hydraulic manifold to sense when the tag axle assembly 10 is up, and switch 131 is connected in the piston side to sense when the tag axle assembly 10 is down.

In operation, it is assumed that the auxiliary of tag axle 10 is in its retracted position. Initially, the battery disconnect switch 112 must then be returned to the on position. Loading on the load bed 14 occurs with the tag axle 10 in its retracted position. The load bed 14 for carrier may be tilted to receive a vehicle and then return to its stored position. Thereafter, the tag axle 10 may be actuated to the extended position to transfer weight to the steering axle. The user holds one the toggle switches 116, 124, 125 to the down position which in turn causes the actuator means 92 to extend thereby extending the tag axle. Once the toggle switches 116, 124, 125 are released, the electric pump is disengaged. Verification that the tag axle is in its fully extended position can be verified by the down indicator light 118. The tag axle must also be retracted before unloading of the load bed. The user merely actuates a toggle switch 116, 124, 125 to the up position which causes retraction of the actuator means 92 to retract the tag axle. Then unloading procedures occur as normal.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A tag axle assembly adapted to selectively provide additional support for a load bearing vehicle, said assembly comprising:

a support frame (24) adapted to be fixedly connected to a vehicle for supporting a pair of auxiliary wheels (22);

engaging means (66) operatively connected to said support frame (24) and the auxiliary wheels (22) for moving between a retracted position removing the auxiliary wheels (22) from ground level and an extended position extending the auxiliary wheels (22) to ground level;

control means (110) operatively connected to said engaging means (66) for selectively controlling the retraction and extension of said engaging means (66);

said control means (110) including actuator means (92) operatively connected between said support frame (24) and said engaging means (66) for moving said engaging means (66); and said assembly characterized by said support frame including housing means for substantially enclosing said actuator means (92) and supporting said engaging means (66), said housing means including pairs of parallel plates (32, 23) spaced to receive said actuator means (92) between said plates (32, 33) and including panels interconnecting at least a portion of said parallel plates for enclosing said actuator means within said parallel plates and panels to limit contaminants from said actuator means.

2. An assembly as set forth in claim 1 further characterized by said support frame (24) including a pair of vertical supports (26) having upper and lower ends for connection to the vehicle at said upper end, said vehicle supports including said housing means.

3. An assembly as set forth in claim 1 further characterized by including two of said actuator means (92), and said housing means including two pairs of said parallel plates (32, 33) and panels for each enclosing one of said actuator means (92).

4. An assembly as set forth in claim 1 further characterized by said parallel plates (32, 33) being substantially triangular in shape each having a base and two sides.

5. An assembly as set forth in claim 4 further characterized by said panels including a panel (34) interconnecting said bases of said plates (32, 33) for connection to the vehicle.

6. An assembly as set forth in claim 5 further characterized by said panels include side panels for interconnecting said sides of said plates (32, 33).

7. A tag axle assembly adapted to selectively provide additional support for a load bearing vehicle having a vehicle frame (12) and a tilting load bed (14) connected thereto, said assembly comprising:

a support frame (24) adapted to be fixedly connected to a vehicle for supporting a pair of auxiliary wheels (22);

said support frame (24) including a pair of vertical supports (26) having upper and lower integral ends spaced apart in a vertical direction for connection to the vehicle at said upper end, said upper end having a horizontal width greater than said lower end, engaging means (36) connected to said lower end of said vertical supports (26) and said auxiliary wheels

(22) for moving in substantially the vertical direction between a stored, non-engaged position with said auxiliary wheels (22) unengaged with a road surface, and an engaged position with said auxiliary wheels engaged with a road surface supporting the vehicle;

actuator means (92) operatively connected to said upper end of said vertical supports (26) and said engaging means (36) for selectively moving said engaging means (36) between said non-engaged and engaged position;

said engaging means (36) including longitudinal pivotal means pivotally connected to said lower end of said support member (26, 28) and having a first longitudinal end adapted to be connected to a wheel and a second longitudinal end, and a pivot point between said first and second longitudinal ends for connection to said support member (26, 28) for pivoting between said engaged position and said non-engaged position with said first longitudinal end aligned with said support member (26, 28) in the vertical direction.

8. An assembly as set forth in claim 7 further characterized by said engaging means (66) including axle means (68) extending between said pair of wheels (22) and pivotally connected to said second end of said pivot means for pivoting the wheel between said engaged and non-engaged positions.

9. An assembly as set forth in claim 8 further characterized by said engaging means (66) including torque arm means (72) having first and second ends and operatively secured to said axle means (68) at said first end and secured to the auxiliary wheels (22) at a second end for pivoting with said axle means (68) with said torque arm means (72) substantially horizontal with the load bed (14) in said engaged position.

10. An assembly as set forth in claim 9 further characterized by said pivot means including a pair of pivot plates having the first and second ends, said first end connected to said axle means (68) and said second end connected to said actuator means, and connected to said support member at the pivot point between said first and second ends for pivoting said axle means (68) in response to movement of said actuator means (92).

11. An assembly as set forth in claim 10 further characterized by said support member comprising a substantially triangular member having a base providing connection to the vehicle and an apex opposite said base providing said lower end of said support member and comprising said pivot point.

12. A tag axle assembly adapted to selectively provide additional support for a load bearing vehicle having a vehicle (14) frame and a tilting load bed connected thereto with rear wheels, said assembly comprising:

support frame (24) adapted to be fixedly connected to a tilting load bed for moving said assembly therewith;

said support frame (24) including a pair of vertical supports (26) having upper and lower integral ends for connection to the vehicle at said upper end, said upper end having a width greater than said lower end, a pair of auxiliary wheels (22);

engaging apparatus (66) operatively connected to said support frame (24) and said auxiliary wheels (22) for moving between a stored, non-engaged position with said auxiliary wheels (22) unengaged with a road surface, and an engaged position with said auxiliary wheels (22) engaged with a road surface supporting the load bed;

said engaging apparatus (66) including a longitudinal pivot plate (86, 87) extending from said supports (26) toward the rear wheels for pivoting between a first position with said pivot plate substantially horizontal and the wheels in contact with a road surface, and a second position with said pivot plate substantially vertical and the wheels raised out of contact with a road surface.

13. An assembly as set forth in claim 12 further characterized by said engaging apparatus (66) including axle means (68) extending between said pair of auxiliary wheels (22) and connected to said pivot plate for pivoting said auxiliary wheels between said engaged and non-engaged positions.

14. An assembly as set forth in claim 13 further characterized by said engaging apparatus (66) including torque arm means (72) having first and second ends and operatively secured to said axle means (68) at said first end and secured to the auxiliary wheels (22) at a second end for pivoting with said axle means (68) with said torque arm means (72) substantially horizontal with the load bed (14) in said engaged position.

15. An assembly as set forth in claim 14 further characterized by said pivot means including a pair of pivot plates having the first and second ends, said first end connected to said axle means (68) and said second end connected to said actuator means, and connected to said support member at the pivot point between said first and second ends for pivoting said axle means (68) in response to movement of said actuator means (92).

16. A tag axle assembly adapted to selectively provide additional support for a load bearing vehicle, said assembly comprising:

a support frame (24) to be fixedly connected to a vehicle and supporting a pair of auxiliary wheels (22);

an engaging apparatus (66) connected to said support frame (24) and the auxiliary wheels (22) having a retracted position removing the auxiliary wheels (22) from ground level and an extended position extending the auxiliary wheel (22) to ground level;

a control apparatus (110) connected to said engaging apparatus (66) controlling the retraction and extension of said engaging apparatus (66);

said control apparatus (110) including an actuator (92) connected between said support frame (24) and said engaging apparatus (66) to move said engaging apparatus (66); and said support frame including a housing substantially enclosing said actuator assembly (92) and supporting said engaging apparatus (66), said housing including a pair of spaced parallel plates (32, 33) receiving said actuator (92) between said plates (32, 33) and including panels connected between at least a portion of said parallel plates enclosing said actuator within said parallel plates and panels limiting contaminants from actuator means.

17. A tag axle assembly adapted to selectively provide additional support for a load bearing vehicle having a vehicle frame (12), said assembly comprising:

a support frame (24) to be fixedly connected to a vehicle supporting a pair of auxiliary wheels (22);

said support frame including a pair of vertical supports (26) having upper and lower integral ends spaced apart in the vertical direction and connected to the vehicle at said upper end, said upper end having a horizontal width greater than said lower end;

engaging apparatus (36) connected to said lower end of said vertical supports (26) and said auxiliary wheels (22) to move in substantially the vertical direction between a stored, non-engaged position with said auxiliary wheels (22) unengaged with a road surface, and an engaged position with said auxiliary wheels engaged with the road surface supporting the vehicle;

actuator assembly (92) connected to said upper end of said vertical supports (26) and said engaging apparatus (36) selectively moving said engaging apparatus (36) between said non-engaged and engaged positions;

said engaging apparatus (36) including longitudinal pivotal means pivotally connected to said lower end of said support member (26, 28) and having a first end adapted to be connected to a wheel and a second end, and a pivot point between said first and second ends connected with said support member (26, 28) pivoting between said engaged position and said non-engaged position with said first end aligned with said support member (26, 28) in the vertical direction.

18. A tag axle assembly adapted to selectively provide additional support for a load bearing vehicle having a vehicle frame (12) and a tilting load bed (14) connected thereto, said assembly comprising;

an auxiliary support frame (24) to be fixedly connected to a tilting load bed (14) of a vehicle supporting a pair of auxiliary wheels (22);

said support frame (24) including a pair of vertical supports (26) having upper and lower integral ends spaced apart in the vertical direction connected to the tilting load bed (14) at said upper end, said upper end having a horizontal width greater than said lower end;

engaging assembly (36) connected to said lower end of said vertical supports (36) and said auxiliary wheels (22) moving in the vertical direction between a stored, non-engaged position with said auxiliary wheels (22) unengaged with a road surface, and an engaged position with said auxiliary wheels engaged with the road surface supporting the load bed;

actuator (92) connected to said upper end of the vertical supports (26) and said engaging assembly (36) to selectively moving said engaging assembly (36) between non-engaged and engaged positions.

* * * * *